United States Patent
Nachmanson et al.

(10) Patent No.: US 9,299,176 B2
(45) Date of Patent: Mar. 29, 2016

(54) VISUALIZING LARGE GRAPHS

(71) Applicant: Microsoft Technology Licensing, LLC, Redmond, WA (US)

(72) Inventors: Lev Nachmanson, Redmond, WA (US); Bongshin Lee, Issaquah, WA (US); Nathalie Henry Riche, Seattle, WA (US); Xiaoji Chen, Seattle, WA (US); Alexander E. Holroyd, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 78 days.

(21) Appl. No.: 14/084,466

(22) Filed: Nov. 19, 2013

(65) Prior Publication Data

US 2015/0138203 A1 May 21, 2015

(51) Int. Cl.
 *G06T 11/20* (2006.01)
(52) U.S. Cl.
 CPC .................................. *G06T 11/206* (2013.01)
(58) Field of Classification Search
 CPC combination set(s) only.
 See application file for complete search history.

(56) References Cited

U.S. PATENT DOCUMENTS

| | | | | |
|---|---|---|---|---|
| 6,122,634 | A * | 9/2000 | Brodsky | 1/1 |
| 8,326,823 | B2 | 12/2012 | Grandhi et al. | |
| 8,823,709 | B2 * | 9/2014 | Grandhi et al. | 345/440 |
| 2004/0088678 | A1 * | 5/2004 | Litoiu et al. | 717/104 |
| 2005/0192926 | A1 * | 9/2005 | Liu et al. | 707/1 |
| 2009/0115785 | A1 | 5/2009 | Grandhi et al. | |
| 2009/0204582 | A1 * | 8/2009 | Grandhi et al. | 707/3 |
| 2010/0287512 | A1 * | 11/2010 | Gan et al. | 715/854 |
| 2011/0063301 | A1 | 3/2011 | Setlur et al. | |
| 2011/0316884 | A1 * | 12/2011 | Giambalvo et al. | 345/660 |
| 2013/0067390 | A1 | 3/2013 | Kwiatkowski et al. | |
| 2014/0365647 | A1 * | 12/2014 | Haraszti | 709/224 |
| 2015/0022527 | A1 * | 1/2015 | Madden et al. | 345/440 |
| 2015/0089422 | A1 * | 3/2015 | Spaulding et al. | 715/771 |

OTHER PUBLICATIONS

Abello, et al., "ASK-GraphView : A Large Scale Graph Visualization System", In IEEE Transactions on Visualization and Computer Graphics, vol. 12, Issue 5, Sep. 2006, pp. 669-676.
Auber, David, "Using Strahler Nos. For Real Time Visual Exploration of Huge Graphs", In International Conference on Computer Vision and Graphics, Sep. 2002, 15 pages.
Auber, David, "Tulip—A Huge Graph Visualization Framework", In Graph Drawing Software, Mathematics and Visualization, Nov. 2003, 22 pages.

(Continued)

*Primary Examiner* — M Good Johnson
(74) *Attorney, Agent, or Firm* — Alin Corie; Sandy Swain; Micky Minhas

(57) ABSTRACT

Large graph visualization embodiments are presented which generally render and display the more important elements for a current view. To this end, a measure of importance referred to as a zoom level is assigned to the vertices and rails of a graph. Each rail is a curve segment in the graph that represents an edge or a set of edges passing through it. The rendering and displaying of a graph (or a part thereof) is done quickly, even as a user moves about the graph, and the visualization of the large graph is not so dense and so full of detail that the user becomes disoriented. In general, this is accomplished by specifying a current viewport, or a current zoom level, or both. Furthermore, the visualization is stable in that the layout of vertices and rails will be the same for the same zoom level and viewport.

20 Claims, 9 Drawing Sheets

(56) References Cited

OTHER PUBLICATIONS

Beckmann, et al., "The R*-tree: An Efficient and Robust Access Method for Points and Rectangles", In Newsletter of ACM SIGMOD Record, vol. 19, Issue 2, Jun. 1990, pp. 322-331.

Brandes, Ulrik, "A Faster Algorithm for Betweenness Centrality", In Journal of Mathematical Sociology, vol. 25, Issue 2, Retrieved on: Aug. 2013, 15 pages.

Brandes, et al., "Eigensolver Methods for Progressive Multidimensional Scaling of Large Data", In Proceedings of the 14th International Conference on Graph Drawing, Sep. 2006, pp. 42-53.

Brunel, E., A. Gemsa, M. Krug, I. Rutter, D. Wagner, Generalizing geometric graphs, GD'11 Proc. of the 19th Int'l Conf. on Graph Drawing, Sep. 2011, pp. 179-190.

Dwyer, et al., "Fast Node Overlap Removal", In Proceedings of the 14th International Conference on Graph Drawing, Sep. 2006, 14 pages.

Dwyer, et al., "Fast Edge-Routing for Large Graphs", In Proceedings of the 17th International Conference on Graph Drawing, Sep. 2009, 15 pages.

Ganpaa, Gayatri, "An R*-Tree Based Semi-Dynamic Clustering Method for the Efficient Processing of Spatial Join in a Shared-Nothing Parallel Database System", In University of New Orleans Theses and Dissertations, Jan. 2006, 103 pages.

Gansner, et al., "Efficient Node Overlap Removal Using a Proximity Stress Model", In 16th Symposium on Graph Drawing, Sep. 2008, 12 pages.

Gansner, et al., "Multilevel Agglomerative Edge Bundling for Visualizing Large Graphs", In IEEE Pacific Visualization Symposium, Mar. 2011, 8 pages.

Gansner, et al., "Topological Fisheye Views for Visualizing Large Graph", In IEEE Transactions on Visualization and Computer Graphics, vol. 11, Issue 4, Jul. 2005, 8 pages.

Heer, et al., "Interactive Dynamics for Visual Analysis", In Magazine of Queue—Micoprocessors, vol. 10, Issue 2, Feb. 2012, 26 pages.

Herman, et al., "Graph Visualization and Navigation in Information Visualization: A Survey", In IEEE Transactions on Visualization and Computer Graphics, vol. 6, Issue 1, Jan. 2000, 20 pages.

Landesberger, et al., "Visual Analysis of Large Graphs", In Computer Graphics Forum, vol. 30, Issue 6, Apr. 2011, 24 pages.

Macko, et al., "Provenance Map Orbiter: Interactive Exploration of Large Provenance Graphs", In Proceedings of the 3rd Workshop on the Theory and Practice of Provenance, Jun. 2011, 6 pages.

Pupyrev, et al., "Edge Routing with Ordered Bundles", In Proceedings of the 19th International Conference on Graph Drawing, Sep. 21, 2011, 14 pages.

Zinsmaier, et al., "Interactive Level-of-Detail Rendering of Large Graphs", In IEEE Transactions on Visualization and Computer Graphics, vol. 18, Issue 12, Dec. 2012, 10 pages.

"International Search Report & Written Opinion Issued in PCT Application No. PCT/US2014/066019", Mailed Date: Apr. 16, 2015, 10 Pages.

Cecconi, et al., "Adaptive Zooming In Web Cartography", In Computer Graphics Forum, vol. 21, Issue 4, Jan. 2002, 14 Pages.

Eades, et al., "Multilevel Visualization of Clustered Graphs", In Proceedings of the Symposium on Graph Drawing, Sep. 18, 1996, 12 Pages.

Schulz, et al., "Visualizing Graphs—A Generalized View", In Proceedings of the Tenth International Conference on Information Visualization, Jul. 5, 2006, 8 Pages.

\* cited by examiner

Setting vertex zoom levels

```
1 SetNodeZoomLevels()
2     for each v ∈ V do
3         z(v) = ∞
4     unassigned = |V|
5     zoomLevel = 1
6     tileSize = S
7     while unassigned > 0 do
8         ProcessNodesOnLevel()
9         zoomLevel = zoomLevel * 2
10        tileSize = tileSize * 0.5
11 ProcessNodesOnLevel() ;
12    for i = 1 to|V| do
13        v = V [i];
14        (i, j) = PointToTile(c(v));
15        if tileMap(i, j) ≥ Q/4 then
16            return;
17        tileMap(i, j) = tileMap(i, j) + 1;
18        if z(v) = ∞ then
19            z(v) = zoomLevel;
20            unassigned = unassigned -1;
21 PointToTile(Point p) ;
22    return ((⌊(x(p) − l)/tileSize⌋, ⌊(y(p) − b)/tileSize⌋);
```

FIG. 3

VISUALIZING LARGE GRAPHS

BACKGROUND

Large graphs are ubiquitous in information technology, social networks, biological networks, etc., and people in these fields would like to browse the graphs they routinely deal with. In general, a large graph is made up of thousands of vertices representing information, and even more information links called edges that connect pairs of vertices. Typically, a large graph is depicted in diagrammatic form as a set of shapes representing the vertices joined by curves representing the edges.

There is a large amount of research on how to lay out a large graph. A graph with several thousand vertices and edges can be laid out in seconds on a regular personal computer. The graph layout is then used to render and display the graph. Viewing and browsing such a graph typically requires that thousands of vertices and edges be rendered and displayed.

SUMMARY

Large graph visualization embodiments described herein generally render and display the more important elements for a current view. This has several advantages. First, the rendering and displaying of a graph (or a part thereof) can be done quickly, even as a user moves about the graph. In addition, the visualization of the large graph is not so dense and so full of detail that the user becomes disoriented trying to understand a huge amount of information all at once.

In order to achieve the foregoing advantages, a measure of importance referred to as a zoom level is assigned to the vertices and rails of a graph. Each rail is a curve segment in the graph that represents an edge or a set of edges passing through it. Assigning zoom level values generally involves first computing and assigning these values to vertices of the graph. This is generally accomplished in one embodiment by assigning a zoom level value associated with the zoom level to vertices deemed to be the most important. The zoom level value is assigned to the vertices deemed to be the most important, in hierarchical order, until at least one region associated with the zoom level includes a prescribed maximum number of vertices with that zoom level value. Then, zoom level values are also computed and assigned to the rails of the graph.

Once zoom level values have been assigned to the vertices and rails of the graph, these elements can be rendered. A currently-specified viewport specifies a portion of the graph that is to be rendered. This can be specified by a user, although initially a default viewport can be used. In one embodiment, the currently-specified viewport defines a currently-specified zoom level by relating the whole graph size to the viewport size. In another embodiment, the currently-specified zoom level can be specified by a user, although it can also be initially set to a default level. Those graph vertices and rails intersecting the currently-specified viewport are rendered whenever their zoom level is less than or equal to the currently-specified zoom level.

The rendered vertices and rails are then displayed to a user and the user can browse the graph. When the viewport changes the rendered elements are updated. Those that are out of the viewport or having a too large zoom level are not rendered. This ensures that the number of rendered elements in any viewport is not large, and yet every element of the graph is visible in some viewport.

It should also be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

FIG. 3 is a pseudocode representation for implementing the part of the process of FIG. 1 involving the computation and assignment of zoom level values to vertices of the graph.

DETAILED DESCRIPTION

Figure 1:
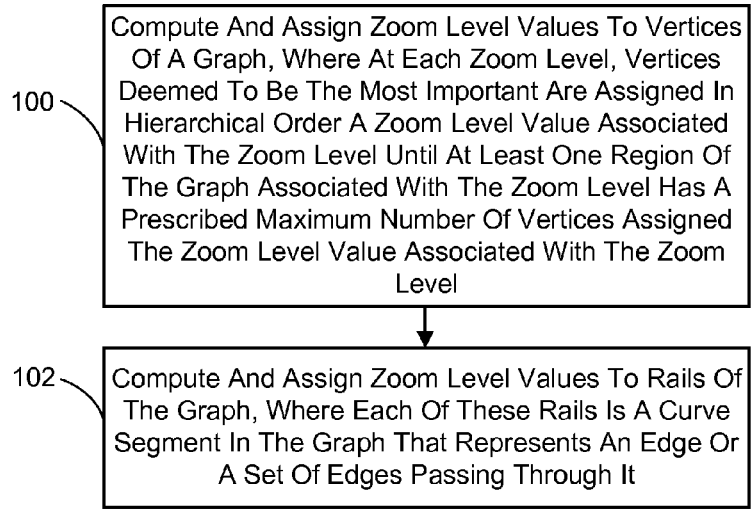
FIG. 1 is a flow diagram generally outlining one embodiment of a process for assigning zoom level values to vertices and rails of a graph.

In the following description of large graph visualization embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

It is also noted that for the sake of clarity specific terminology will be resorted to in describing the large graph visualization embodiments described herein and it is not intended for these embodiments to be limited to the specific terms so chosen. Furthermore, it is to be understood that each specific term includes all its technical equivalents that operate in a broadly similar manner to achieve a similar purpose. Reference herein to "one embodiment", or "another embodiment", or an "exemplary embodiment", or an "alternate embodiment", or "one implementation", or "another implementation", or an "exemplary implementation", or an "alternate implementation" means that a particular feature, a particular structure, or particular characteristics described in connection with the embodiment or implementation can be included in at least one embodiment of large graph visualization. The appearances of the phrases "in one embodiment", "in another embodiment", "in an exemplary embodiment", "in an alternate embodiment", "in one implementation", "in another implementation", "in an exemplary implementation", "in an alternate implementation" in various places in the specification are not necessarily all referring to the same embodiment or implementation, nor are separate or alternative embodiments/implementations mutually exclusive of other embodiments/implementations. Yet further, the order of process flow representing one or more embodiments or implementations of large graph visualization does not inherently indicate any particular order nor imply any limitations.

1.0 Large Graph Visualization

When a user browses a display of a large graph it is desirable to be able to follow an edge by panning the viewport the same way one would follow a road when browsing a map. For example, it is desirable to see the same entities if the viewport only slightly shifts. It is also advantageous if the visualization of the large graph is not so dense and so full of detail that the user becomes disoriented. And finally, it is advantageous when viewing a large graph if the rendering and display is done quickly as the user moves about the graph. The large graph visualization embodiments described herein provide these advantages and others.

This is generally accomplished by setting a global upper bound on the number of elements rendered and displayed in each screen shown to the user. Thus, the amount of detail presented on the screen is controlled in order to prevent overwhelming the user or the graphic card with too much information at once. More particularly, the large graph visualization embodiments described herein assign a positive zoom level value to each element of the graph, where the smaller the value, the more important the element is in the graph. A graph element intersecting the currently specified viewport is rendered fully if and only if its zoom level is not greater than the current zoom factor. In addition, the viewport defines the view completely in that each time the same viewport is viewed, the set of rendered entities is the same. In addition, the positions of the vertices do not change. And further, if an entity (e.g., vertex or edge) is visible at a specific scale at some viewport, it has to be visible at this scale, or at a larger scale, in any other viewport it intersects. This enables the user to follow a path in the graph by panning.

Generally, the large graph visualization embodiments described herein start with a given layout and edge routes. Any appropriate conventional large graph layout method can be employed to accomplish this task. For each element e (a vertex or an edge), a real number is defined as $z(e) \geq 0$. The number $z(e)$ is the zoom level value of element e. While browsing the graph, e is rendered fully if and only if it intersects the current viewport and the current scale is greater than or equal to $z(e)$.

1.1 Calculation of Zoom Levels

Let $G=(V,E)$ be the graph, where V is the set of the vertices and E is the set of the edges of the graph. This graph is input, as is a layout of G. In addition, vertex importance data is input. This vertex importance data includes a hierarchical list of the set of vertices V ordered from the vertex deemed to be the most important to the vertex deemed to be the least important. The vertex importance data can be provided as part of the graph itself, or provided by the user. It is also possible to compute vertex importance data if it is not available. For example, the vertices can be hierarchically sorted using a conventional method such as the pagerank algorithm, or by using vertex degree (highest degree first), or by using a shortest-path betweenness method.

The aforementioned layout provides, for each vertex $v \in V$, a simple closed curve b(v) on the plane representing the boundary of v. The point c(v) is defined as the center of the bounding box of b(v), and is deemed the vertex's position. It is assumed for the purpose of this description that for different u, $v \in V$ the bounding boxes of b(u) and b(v) do not overlap. This can be achieved by inputting a graph layout computed using a conventional node overlap removal method. For each edge e=(uv) its route is defined as r(e), which is a curve on the plane. Curve r(e) connects b(u) and b(v).

Given the foregoing, in one implementation outlined in FIG. 1, assigning zoom level values to vertices and rails of a graph generally involves first using a computer to compute and assign zoom level values to vertices of the graph, where at each zoom level, vertices deemed to be the most important are assigned in hierarchical order a zoom level value associated with the zoom level until at least one region of the graph associated with the zoom level has a prescribed maximum number of vertices assigned the zoom level value associated with the zoom level (process action 100). Zoom level values are then computed and assigned to rails of the graph (process action 102). As will be described in more detail later in this disclosure, each of these rails is a curve segment in the graph that represents an edge or a set of edges passing through it.

1.1.1 Setting Zoom Level Values for Vertices

Denote by B the bounding box of G, and let S be the minimum of the width and height of B. Consider a square $R \subset B$. Let s be the length of a side of R. It is natural to define $s(R)=S/s$ as the scale factor of R to B. A real valued function z defined on V and a square R, define a set $V(R, z)=\{v \in V: z(v) \leq s(R) \text{ and } c(v) \in R\}$. This set is called the slice of V by R and z. In the zoom function z, if R is a maximal square contained in the visible viewport, the vertices of V(R, z) are exactly the ones that have centers belonging to R and are fully displayed to the user.

As indicated previously, in order to enable a good browsing experience it is advantageous to keep the number of vertices in slices of V not too large. This is accomplished by setting zoom levels of the vertices using a positive integer Q, which is referred to as the vertex quota. Function z, defined on V, respects Q if for each square $R \subset B$ the relation $|V(R, z)| \leq Q$ holds. For integers i, j and for a given value of variable "tileSize", $T_{ij}$(tileSize) is defined as a square with the sides of length "tileSize" and the bottom left corner with coordinates x=l+i×tileSize and y=b+j×tileSize, where (l, b) is the left bottom corner of B. $T_{ij}$ (tileSize) is referred to hereinafter as a tile.

Figure 2A:
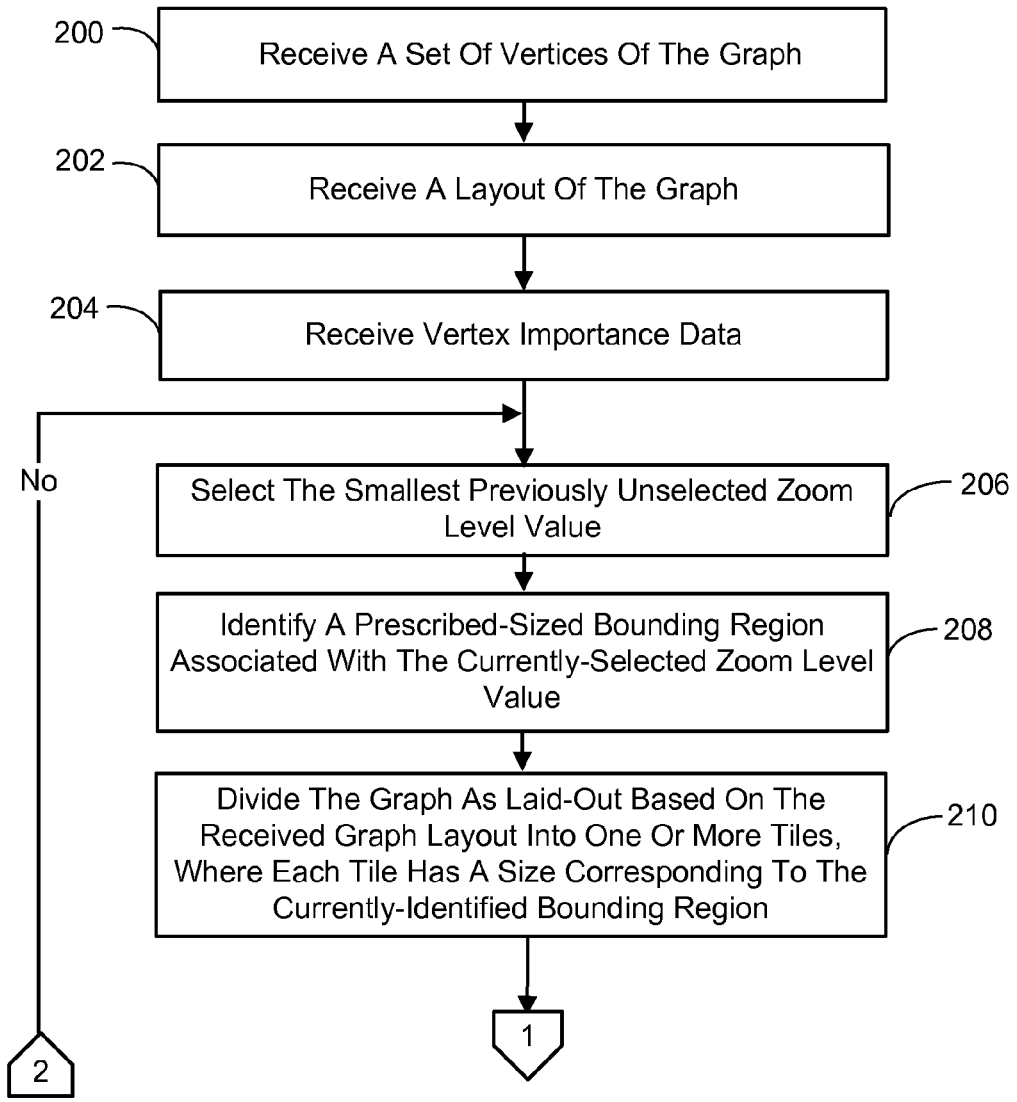
FIGS. 2A-B are a flow diagram generally outlining an implementation of the part of the process of FIG. 1 involving the computation and assignment of zoom level values to vertices of the graph.
Figure 2B:
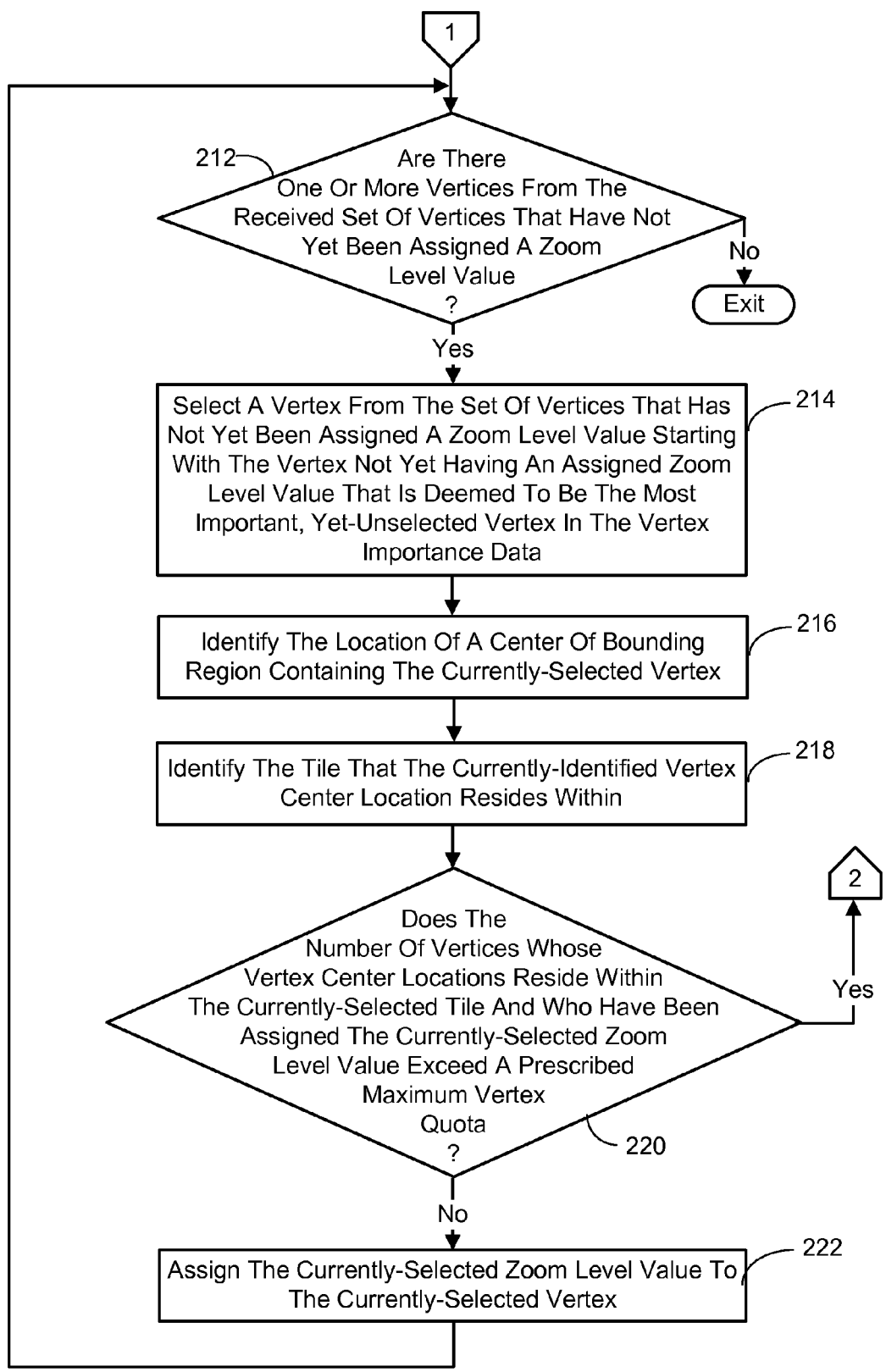

In view of the foregoing, FIGS. 2A-B outline a general embodiment for computing and assigning zoom level values to vertices of the graph. This involves first receiving a set of vertices of the graph (process action 200), receiving a layout of the graph that includes the locations of each vertex in the received set of vertices (process action 202), and receiving vertex importance data that includes a hierarchical list of the received set of vertices ordered from the vertex deemed to be the most important to the vertex deemed to be the least important (process action 204). The received information is then used as follows.

The smallest previously unselected zoom level value is selected from a hierarchically-ordered set of zoom levels which ranges from smaller zoom level values to larger zoom level values (process action 206). A prescribed-sized bounding region associated with the currently-selected zoom level value is identified (process action 208), and the graph, as laid-out based on the received graph layout, is divided into one or more tiles, where each tile has a size corresponding to the currently-identified bounding region (process action 210). It is next determined whether there are one or more vertices from the received set of vertices that have not yet been assigned a zoom level value (process action 212). If not, the process ends. However, if there are one or more vertices from the received set of vertices that have not yet been assigned a zoom level value, a vertex is selected from the set in an order dictated by the vertex importance data starting with the vertex not yet having an assigned zoom level value that is deemed to be the most important, yet-unselected vertex in the vertex importance data (process action 214). The location of a center of a bounding region containing the currently-selected vertex is then identified using the graph layout (process action 216), and the tile that the currently-identified vertex center location resides within is also identified (process action 218).

It is next determined whether the number of vertices whose vertex center locations reside within the currently-identified tile and who have been assigned the currently-selected zoom level value exceed a prescribed maximum vertex quota (process action 220). Whenever the number of vertices whose vertex center locations reside within the currently-selected tile and who have been assigned the currently-selected zoom level value does not exceed the prescribed maximum vertex quota, the currently-selected zoom level value is assigned to the currently-selected vertex (process action 222), and process actions 212 through 222 are repeated. However, if it is determined that the number of vertices whose vertex center locations reside within the currently-selected tile and who have been assigned the currently-selected zoom level value exceeds the prescribed maximum vertex quota, then process actions 206 through 222 are repeated.

A more particular, mathematical based implementation for computing and assigning zoom level values to vertices of the graph is found in the pseudocode procedure of FIG. 3. In general, this procedure covers the graph with square tiles and, starting from the beginning of array V, fills the tiles with vertices until reaching a threshold at least in one tile. When assigning to a tile a vertex v with $z(v)$ still equal to 1, $z(v)$ is set to "zoomLevel". In ProcessNodesOnLevel( ) tileMap is a map from $\mathbb{Z} \times \mathbb{Z}$ to $\mathbb{Z}$, where $\mathbb{Z}$ is the set of integers; the value tileMap(i, j) indicates how many vertices are assigned to $T_{ij}$(tileSize). For a point p from the plane functions x(p) and y(p) denote its x and, respectively, y coordinates. Notice that in the implementation tileMap is defined only for i, j such that $T_{ij}$(tileSize) is hit by some c(v). In addition, it can be seen that zoomLevel=$2^{n-1}$ and tileSize=$2^{1-n}$S during the n-th call to "ProcessNodesOnLevel", where n={1, 2, 3, . . . }. Further, when $Q^V \geq 4$, the procedure stops and thus defines function z respecting Q. More particularly, z is set in such a way that for any n, i, j and tileSize=$2^{1-n}$, and T=$T_{ij}$(tileSize); $|V(T, z)| \leq Q/4$. In one tested embodiment, the value for the vertex quota Q was set to 20. It is noted that while square tiles were employed in the foregoing implementation, this need not be the case. Rather, the tiles can take any appropriate shape (e.g., triangular, rectangular, polygonal, circular, and so on).

1.1.2 Setting Zoom Level Values for Rails

Once the graph vertices have been assigned zoom level values, the set of vertices V can be represented as $\cup Vn$, where $Vn=\{v \in V: z(v) \leq 2^{n-1}\}$. Set Vn is referred to as the core set of vertices of the n-th level. The general scheme of assigning zoom levels to rails is the following. In the preprocessing step for each Vn a set of edges En c E is built. A sparse visibility graph is constructed on Vn, and the edges of En are routed on this graph. Curve segments are then found that are covered by one of several edge routes. These segments are the aforementioned rails, and a minimal set of rails are found such that all edge routes of En are represented. The set of rails obtained this way is denoted as Rn in the description to follow. For each rail r∈Rn the zoom level value is set to $z(r)=2^{n-1}$. To reduce the number of rendered elements and improve the readability of rendered elements, the edge curves are not rendered. Instead, only the rails are rendered.

It is noted that in one embodiment, En is chosen as follows. V* denotes a small subset of V made up of several "most important" nodes, e.g., those nodes that appear highest in the vertex importance data. In tested embodiments, V* was set to be at most 50 vertices. En is set equal to Sn∪Tn. Here Sn is the set of edges E with both ends at Vn, and Tn is the union of all the shortest paths between each vertex of Vn∩V* to each vertex in Vn.

Figure 4A:
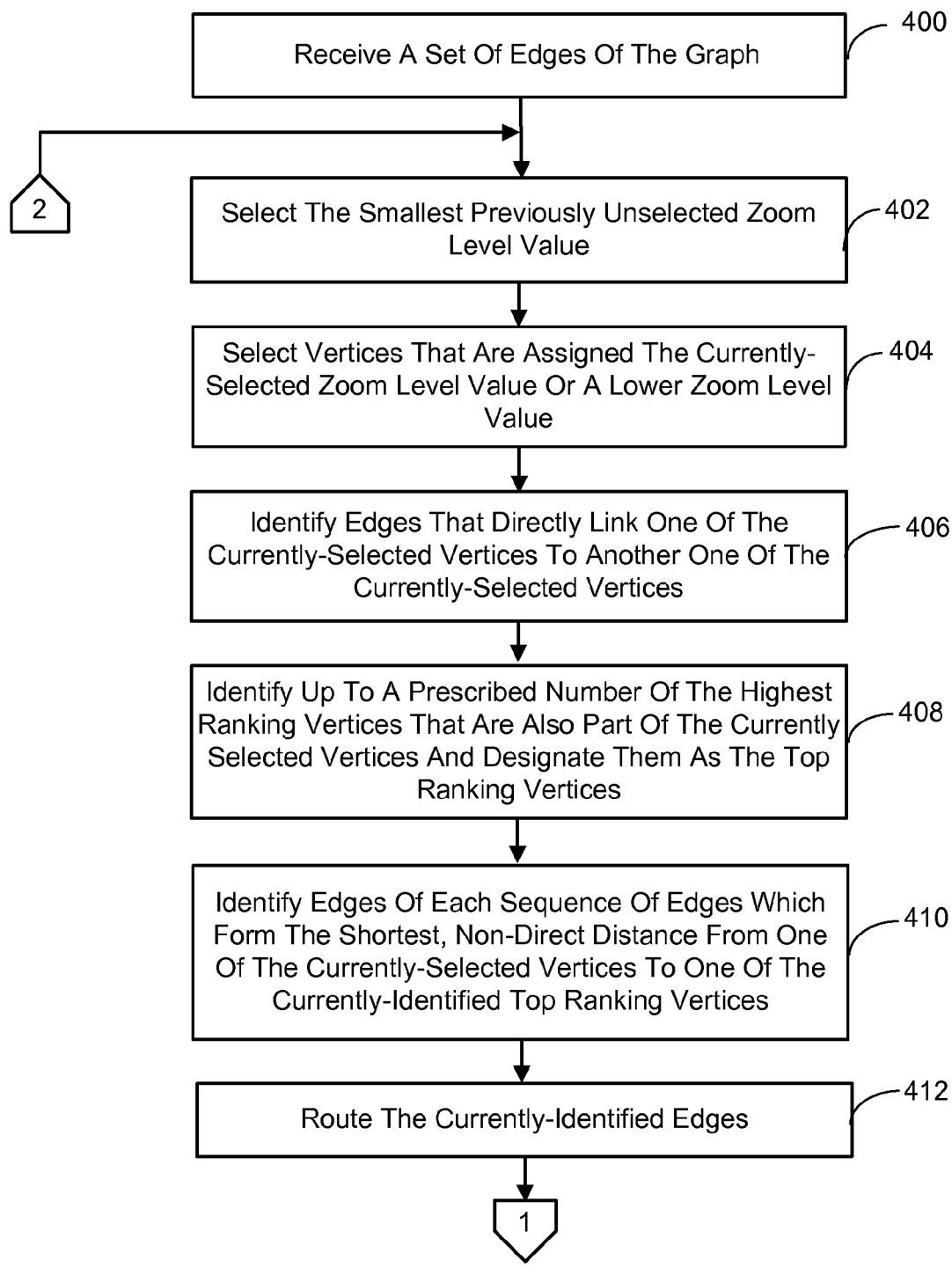
FIGS. 4A-B are a flow diagram generally outlining an implementation of the part of the process of FIG. 1 involving the computation and assignment of zoom level values to rails of the graph.
Figure 4B:
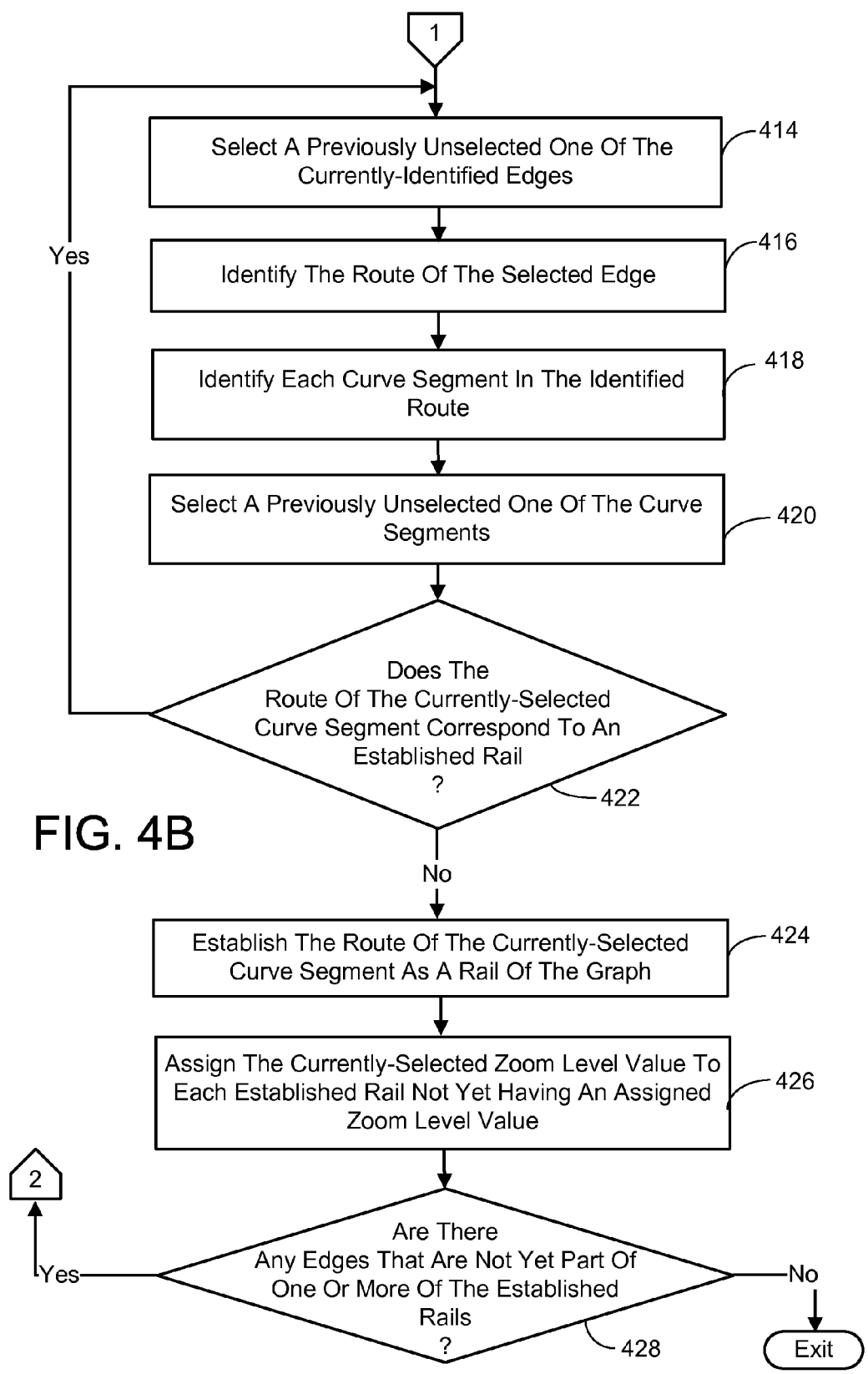

In view of the foregoing, FIGS. 4A-B outline a general embodiment for identifying edges that are to make up the rails at each zoom level, and then forming the rails and assigning zoom level values to them. First, a set of edges of the graph is received (process action 400). This set of edges can have been received with the other information described previously (e.g., the set of vertices, the graph layout and the vertex importance data). The smallest zoom level value is then selected (from the aforementioned hierarchically-ordered set of zoom levels) which has not been selected before in connection computing and assigning zoom level values to rails of the graph (process action 402). Vertices that are assigned the currently-selected zoom level value or a lower zoom level value are selected next (process action 404). Using the aforementioned graph layout, edges are identified that directly link one of the currently-selected vertices to another one of the currently-selected vertices (process action 406). It is noted that the graph layout includes the location of each edge in the received set of edges. Next, up to a prescribed number (e.g., 50) of the highest ranking vertices that are also part of the currently selected vertices are identified and designated as the top ranking vertices (process action 408). Again using the graph layout, edges of each sequence of edges which form the shortest, non-direct distance from one of the currently-selected vertices to one of the currently identified top ranking vertices are identified (process action 410).

The currently-identified edges are then routed using any appropriate conventional method (process action 412), and a previously unselected one of the identified edges is selected (process action 414). The route of the selected edge is identified next (process action 416), and then each curve segment in this route is identified (process action 418). A previously unselected one of the curve segments is selected (process action 420). Then, it is determined if the route of the currently-selected curve segment corresponds (e.g., is covered by) to an established rail (process action 422). If it does not, then the route of the currently-selected curve segment is established as a rail of the graph (process action 424). However, if the route of the currently-selected curve segment does correspond to an established rail, no action is taken, and process actions 414 through 424 are repeated.

Once all the currently-identified edges have been selected and processed, the currently-selected zoom level value is assigned to each established rail not yet having an assigned zoom level value (process action 426). It is then determined whether there are any edges in the received set of edges that are not yet part of one or more of the established rails having assigned zoom level values (process action 428). If there are any such edges, process actions 402 through 428 are repeated until all the edges have been selected, formed into rails and the rails are assigned a zoom level value.

1.2 System for Implementing the Large Graph Visualization Embodiments

Figure 5:
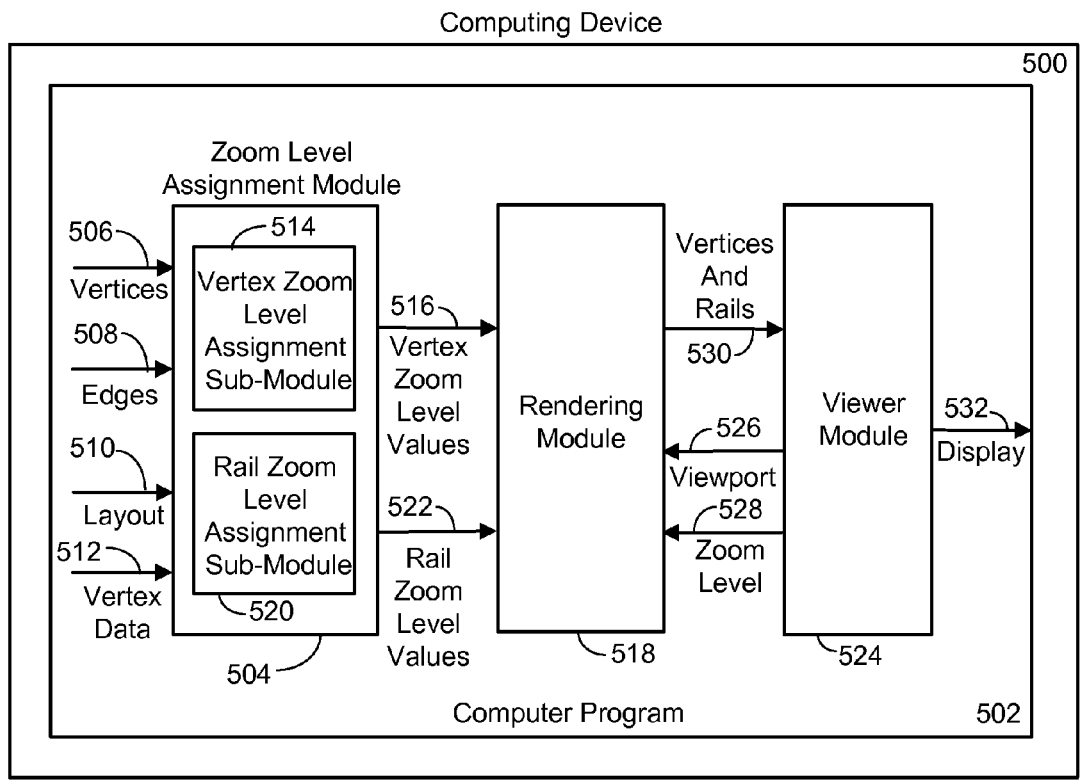
FIG. 5 is a simplified diagram of a system for visualizing and browsing a graph made up of vertices and rails.

Before describing the rendering of the graph vertices and rails, and the display of the graph (or portions thereof) to the user, a general description of a suitable system in which the large graph visualization embodiments described herein may be implemented would be useful. Referring to FIG. 5, the system for browsing a graph made up of vertices and edges is depicted. In general, the system includes one or more computing devices, and one or more computer programs having program modules that are executed by the computing device. In the exemplary system depicted in FIG. 5, all the computer modules are shown as being part of the same computer program 502, which is running on a single computing device 500. More particularly, the zoom level assignment module 504 implements the processes for setting the zoom level values of the graph vertices and rails described previously. In one implementation, the zoom level assignment module 504 takes as inputs: a set of vertices of the graph 506; a set of edges of the graph 508; a layout of the graph 510; and the aforementioned vertex importance data 512. A vertex zoom level assignment sub-module 514 within assignment module 504 computes and assigns zoom level values 516 to the inputted vertices of the graph, and outputs these values to a rendering module 518. In addition, a rail zoom level assignment sub-module 520 within assignment module 504 computes and assigns zoom level values 522 to rails formed from the inputted edges of the graph, and outputs these values to the rendering module 518. The rendering module 518 inputs the vertex zoom level values 516 and the rail zoom level values 522, and via a two-way communication with a viewer module 524, inputs a currently-specified viewport 526 (which specifies a portion of the graph that is to be rendered) and a currently-specified zoom level 528. It is noted that the initial viewport and zoom level specification can be default settings, or specified by a user. Further, in one embodiment, the zoom level is determined by the scale of the viewport and need not be specified by the user. The rendering module 518 then renders those graph vertices and rails intersecting the currently-specified viewport 526 whenever the assigned zoom level value of the intersecting vertex or rail is less than or equal to the currently-specified zoom level 528. The rendered vertices and rails 530 are then sent to the viewer module 524, which outputs a display 532 of the graph (or a portion thereof) to a user.

It is noted that the foregoing system can be interactive in that the user can interact with the viewer module to move the viewport (for example, by dragging the viewport with a mouse), which causes the viewer module to send a message to the rendering module that includes the new location viewport specifications. In addition, the user can interact with the viewer module to change the zoom level via an appropriate interface of the viewer module (for example, by rotating the mouse wheel), which causes the viewer module to send a message to the rendering module that includes the new zoom level specifications. The rendering module uses the newly specified viewport or zoom level, or both, to render those graph vertices and rails intersecting the currently-specified viewport whenever the assigned zoom level value of the intersecting vertex or rail is less than or equal to the currently-specified zoom level. The newly rendered vertices and rails are then sent to the viewer module for display to a user.

It is further noted that the foregoing computer modules could be split so as to be part of multiple programs running on multiple computing devices. For example, the zoom level assignment module could be running on one or more computers (e.g., such as in the context of a cloud service) separate from the rest of the modules. The rendering module could likewise be running on one or more computers (e.g., such as in the context of a cloud service) separate from the rest of the modules; or it could be running on the same computer as the zoom level assignment module; or it could be running on the same computer as the viewer module. In the foregoing multiple computing device scenarios, the transfer of data to and from the modules can occur over a computer network (such as the Internet or a proprietary intranet).

1.3 Rendering Vertices and Rails of the Graph

Figure 6:
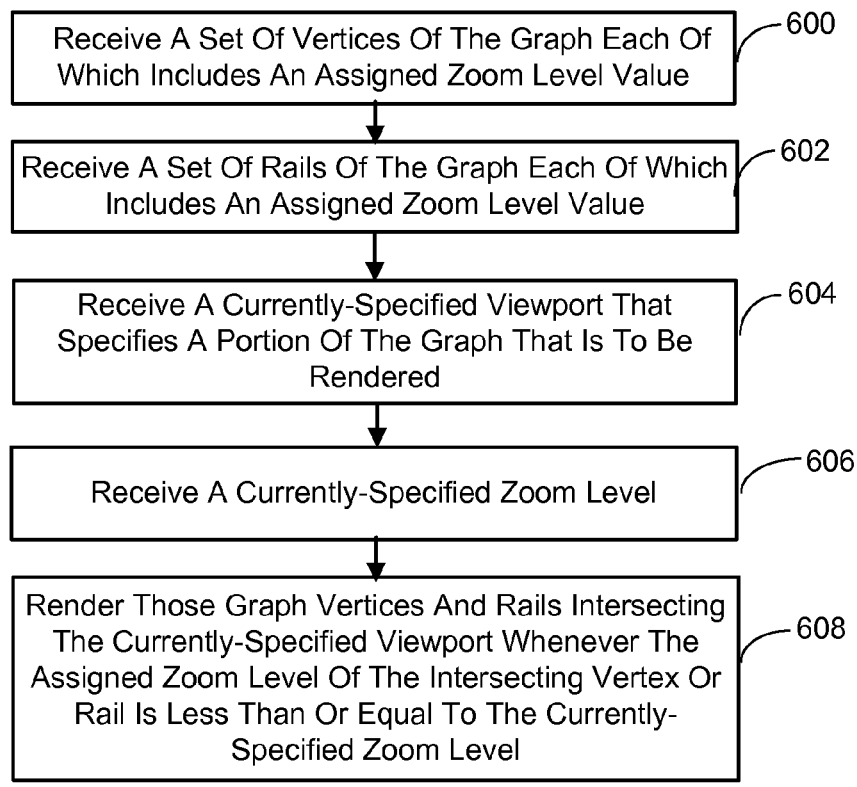
FIG. 6 is a flow diagram generally outlining one embodiment of a process for rendering vertices and rails of a graph.

As indicated previously, and illustrated in FIG. 6, rendering involves using a computer to receiving a set of vertices of the graph (process action 600), each of which includes an assigned zoom level value. In addition, a set of rails of the graph is received (process action 602), where each rail includes an assigned zoom level value. Further, a currently-specified viewport is received (process action 604) that specifies a portion of the graph that is to be rendered, and a currently-specified zoom level is received (process action 606). Once all the foregoing items have been received, the rendering involves rendering those graph vertices and rails intersecting the currently-specified viewport whenever the assigned zoom level of the intersecting vertex or rail is less than or equal to the currently-specified zoom level (process action 608). The rendered vertices and rails can then be sent to a viewer for display to a user who is browsing the graph.

With regard to rendering those graph vertices and rails intersecting the currently-specified viewport whenever the assigned zoom level of the intersecting vertex or rail is less than or equal to the currently-specified zoom level, the term intersecting can be defined in various ways. For example, in one implementation, a vertex is defined as intersecting the currently-specified viewport whenever a central point of a bounding region containing the vertex falls within the viewport; and a rail is defined as intersecting the currently-specified viewport whenever any part of the rail falls within the viewport. However, other definitions of intersecting can also be employed.

In another implementation, as before, those graph vertices and rails intersecting the currently-specified viewport are rendered whenever the assigned zoom level of the intersecting vertex or rail is less than or equal to the currently-specified zoom level. However, in addition, each vertex having an assigned zoom level which is larger than the currently-specified zoom level is rendered whenever a central point of a bounding region containing the vertex falls within the viewport and the vertex is a terminus of a rail having an assigned zoom level that is less than or equal to the currently-specified zoom level which intersects the currently-specified viewport. In this implementation, vertices rendered even though they have an assigned zoom level which is larger than the currently-specified zoom level can be distinguished from vertices that do have an assigned zoom level which is less than or equal to the currently-specified zoom level when displayed to a user. For example, these vertices can be rendered so that they are displayed with a transparency setting that is greater than the no transparency setting exhibited by the intersecting vertices that do have an assigned zoom level which is less than or equal to the currently-specified zoom level. This will sometimes be referred to as a grayed-out state in the descriptions to follow.

In yet another implementation of the rendering action, let $W \subset B$ be the viewport rectangle. $G_W$ denotes the subgraph of G that is rendered for W. Let $G_W=(V_W, R_W)$, where $V_W \subset V$ is the set of vertices and $R_W \subset R$ is the set of rails. Now denote by R.h the height of a rectangle Rec and by R.w its width. The scale of rectangle Rec is $s(Rec)=\min(B.h/R.h, B.w/R.w)$. $R_W$ is set equal to $\{r \in R|$ such that $z(r) \leq \alpha s(W)$ and r intersects $W\}$. Here $1<\alpha<2$ is a parameter whose default value in tested embodiments was set to 1.4. When rendering rail r, its transparency is set to non-transparent (e.g., 0) if $z(r) \leq s(w)$ (so the rail is opaque), and its transparency is set to full transparency (e.g., 1) when $z(r)=\alpha s(w)$, (so such rail is invisible). For rails r with $z(r) \in [s(w), \alpha s(w)]$ the transparency changes linearly depending on $z(r)$. After defining $R_W$, $V_W$ is set equal to $\{v \in V:$ bounding box of $b(v)$ intersects W, and $z(v) \leq \alpha s(W)\} \cup P(R_W)$. A vertex belongs to $P(R_W)$ if and only if it is adjacent to an path from $R_W$ and its bounding box intersects W. For $v \in V_W$ with $z(v) \leq s(W)$ $b(v)$ is rendered without a change, but when $z(v) \geq \alpha s(W)$, $b(v)$ is scaled down around the vertex center with scale $0 < \beta < 1$ ($\beta=0:1$ in tested embodiments). The scale of $b(v)$ is increased linearly from $\beta$ to 1 when $z(r)$ decreases from $\alpha s(W)$ to $s(W)$. This continuous change of visibility attributes helps in avoiding abrupt view changes.

To find the vertices and the rails intersecting W, in one implementation, the R*tree structure is used. If W is a square, then it can be shown that $|V_W| \leq 4Q$ and $|R_W| \leq 4Q_R$ for any $1<\alpha<2$. However, if it is assumed that the vertices and the rails are spread uniformly over the graph bounding box, then $|V_W| \leq \alpha^2 Q$ and $|R_W| \leq \alpha^2 Q_R$. Thus, by keeping Q and $Q_R$ low, the number of elements to render can be controlled.

Figure 7:
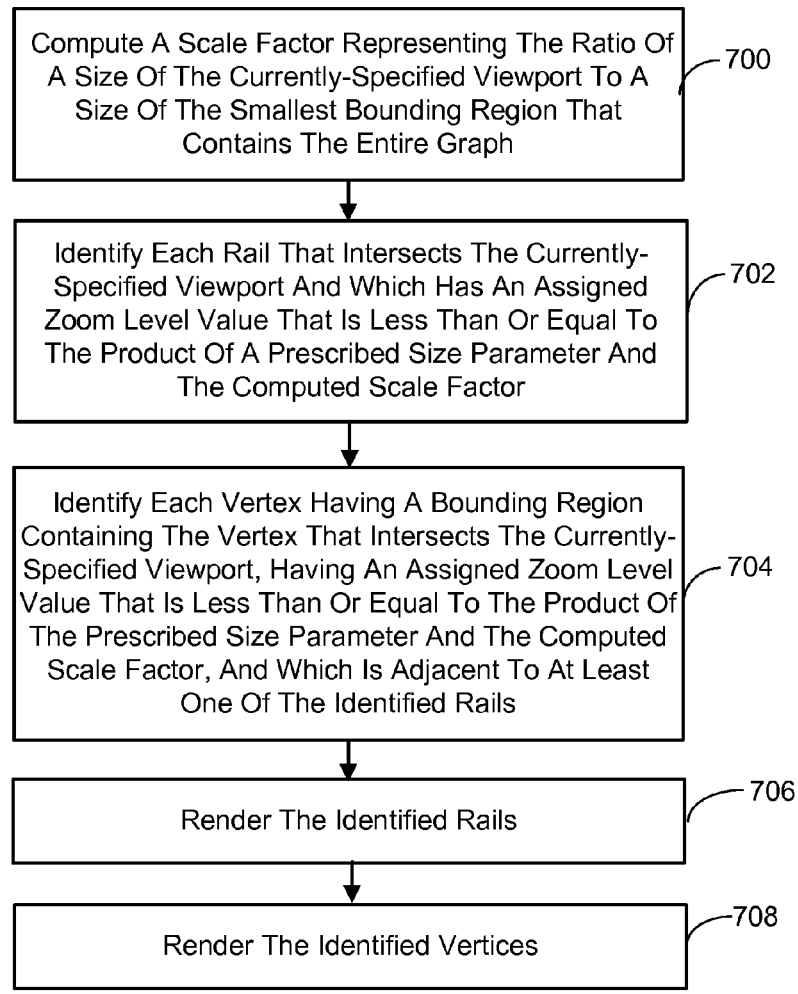
FIG. 7 is a flow diagram generally outlining an implementation of the part of the process of FIG. 6 involving rendering those graph vertices and rails intersecting the currently-specified viewport.

In view of the foregoing, referring to FIG. 7, in one implementation, rendering those graph vertices and rails intersecting the currently-specified viewport involves first computing a scale factor representing the ratio of a size of the currently specified viewport to a size of the smallest bounding region that contains the entire graph (process action 700). Each rail that intersects the currently-specified viewport and which has an assigned zoom level value that is less than or equal to the product of a prescribed size parameter and the computed scale factor is then identified (process action 702). In addition, each vertex having a bounding region containing the vertex that intersects the currently-specified viewport, having an assigned zoom level value that is less than or equal to the product of the prescribed size parameter and the computed scale factor, and which is adjacent to at least one of the identified rails, is identified as well (process action 704). It is noted that a vertex is considered adjacent a rail if the rail links the vertex to another vertex. The identified rails are then rendered (process action 706), as well as the identified vertices (process action 708).

Figure 8:
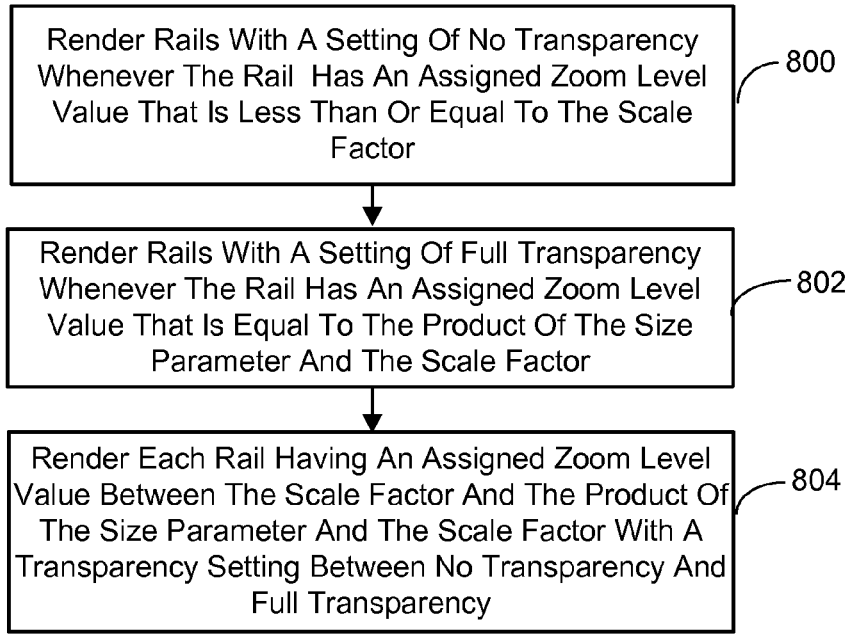
FIG. 8 is a flow diagram generally outlining another implementation of the part of the process of FIG. 6 involving rendering rails of the graph.

In one implementation, the foregoing rendering of the identified rails involves, as shown in FIG. 8, rendering rails with a setting of no transparency whenever the rail has an assigned zoom level value that is less than or equal to the scale factor (process action 800). Rails are rendered with a setting of full transparency whenever the rail has an assigned zoom level value that is equal to the product of the size parameter and the scale factor (process action 802). And, each rail having an assigned zoom level value between the scale factor and the product of the size parameter and the scale factor is rendered with a transparency setting between no transparency and full transparency (process action 804). In one version, this latter rendering involves assigning the transparency setting linearly between no transparency and full transparency based on the assigned zoom level value.

Figure 9:
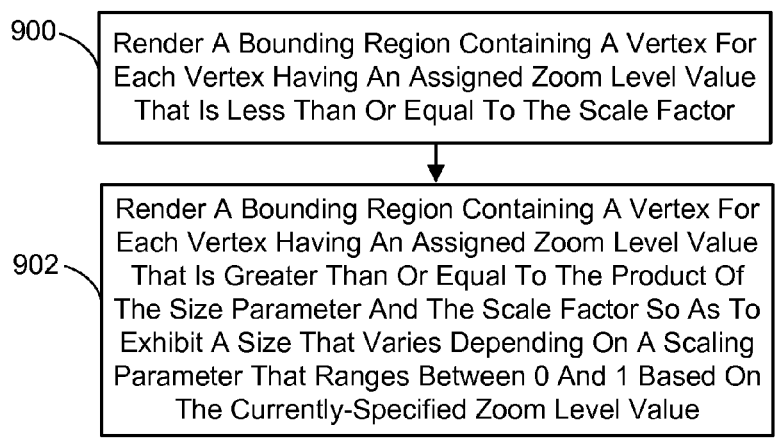
FIG. 9 is a flow diagram generally outlining another implementation of the part of the process of FIG. 6 involving rendering vertices of the graph.

In one implementation, the foregoing rendering of the identified vertices involves, as shown in FIG. 9, first rendering a bounding region containing a vertex for each vertex having an assigned zoom level value that is less than or equal to the scale factor (process action 900). In addition, a bounding region containing a vertex is rendered for each vertex having an assigned zoom level value that is greater than or equal to the product of the size parameter and the scale factor so as to exhibit a size that varies depending a scaling parameter that ranges between 0 and 1 based on the currently-specified zoom level value wherein the scaling parameter increases as the currently-specified zoom level value decreases (process action 902). In one version, this latter rendering involves rendering the boundary region with a size that inversely varies linearly with the scaling parameter.

1.4 Browsing the Graph

As described previously, the large graph visualization embodiments described herein can be interactive in that the user can interact with the aforementioned viewer module to move the viewport, or change the zoom level, or both. The aforementioned rendering module uses the newly specified viewport or zoom level (or both) to render those graph vertices and rails intersecting the currently-specified viewport whenever the assigned zoom level value of the intersecting vertex or rail is less than or equal to the currently-specified zoom level. The newly rendered vertices and rails are then sent to the viewer module for display to a user. In this way, the user can browse through a large graph by selecting different portion of the graph to view, and vary the detail shown by varying the zoom level. For example, a user could follow a rail through the graph to find a vertex associated therewith that was not displayed in the previous viewport.

Figure 10:
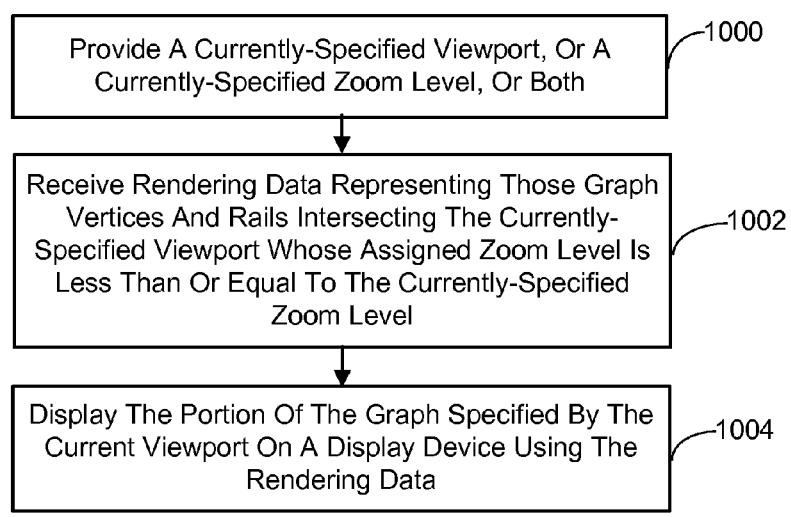
FIG. 10 is a flow diagram generally outlining one embodiment of a process for browsing a graph made up of vertices and rails.

In view of the foregoing, and referring to FIG. 10, in one implementation, browsing a graph made up of vertices and rails involves using a computer to provide a currently-specified viewport which specifies a portion of the graph that is to be viewed, or a currently-specified zoom level, or both (process action 1000). Rendering data representing those graph vertices and rails intersecting the currently-specified viewport whose assigned zoom level is less than or equal to the currently-specified zoom level is then received (process action 1002). It is noted that the currently-specified viewport can be one that has been changed in process action 1000, or one that was previously specified but is still desired to be the current viewport. Likewise, the currently-specified zoom level can be one that has been changed in process action 1000, or one that was previously specified but is still desired to be the current zoom level. In addition, as mentioned previously, the initial viewport and zoom level specification can be default settings, or specified by a user. Once the rendering data is received, the portion of the graph specified by the current viewport is displayed on a display device using the rendering data (process action 1004).

1.4.1 Additional Interactive Browsing Features

In the foregoing exemplary browsing implementation, the interaction involved zooming (changing the zoom level) and panning (changing the viewport). However, other implementations can include additional interactive features. For example, in one implementation, a global zoom level value ("0" in this example) is added to the set of possible zoom level values. Vertices or rails assigned a zoom level value of "0" are displayed regardless of the currently-specified zoom level. Thus, a vertex or rail with a zoom level of "0" that intersects the currently-specified viewport is rendered and provided to the viewer module each time rendering information is generated. The viewer module then displays these vertices and rails based on the rendering information. With regard to how a vertex or rail is assigned a zoom level of "0", this is accomplished via user interaction rather than using the previously-described procedures for setting the zoom level values of graph element. More particularly, the vertices and rails of the graph will be assigned some zoom level value as described previously. However, a user can specify via the aforementioned viewer module that a particular vertex or rail be toggled from its initially assigned zoom level to a zoom level of "0" (and vice versa). The viewer module provides this graph element zoom level change information to the aforementioned rendering module for purposes of rendering these elements. Further, the elements having a user-specified zoom level of "0" can be visually highlighted in the displayed portion of the graph. This aids in a quick identification of those elements toggled to a zoom level of "0", so that the user can readily toggle the element's zoom level back to its originally assigned value if desired.

Another implementation involves rendering and displaying all rails located adjacent a vertex, regardless of their assigned zoom level value or the currently specified zoom level, if such an action is specified by the user. More particularly, the rails of the graph are assigned some zoom level value as described previously. However, a user can specify via the aforementioned view module that all rails adjacent to a user-identified vertex be toggled from their initially assigned zoom levels to a special zoom level (and vice versa). In one embodiment, this special zoom level value is "−1". The viewer module provides this rail zoom level change information to the rendering module for purposes of rendering these elements. Further, the rails having a user-specified zoom level of "−1" can be visually highlighted in the displayed portion of the graph. This aids in a quick identification of those rails toggled to a zoom level of "−1", so that the user can readily toggle the element's zoom level back to its originally assigned value if desired.

Another implementation involves the previously described scheme where each vertex having an assigned zoom level which is larger than the currently-specified zoom level is rendered whenever a central point of a bounding region containing the vertex falls within the viewport and the vertex is a terminus of a rail having an assigned zoom level that is less than or equal to the currently-specified zoom level which intersects the currently-specified viewport. It was stated that vertices rendered even though they have an assigned zoom level which is larger than the currently-specified zoom level can be distinguished from vertices that do have an assigned zoom level which is less than or equal to the currently-specified zoom level when displayed to a user (e.g., by graying-out the higher zoom level vertices). This feature can be made interactive by allowing a user to turn the feature of displaying the higher zoom level vertices on and off, and by allowing the user to specify whether the higher zoom level vertices, when displayed, are to be grayed-out or not. Even further, in one implementation, the user can direct that vertices having an assigned zoom level which is larger than the currently-specified zoom level to be displayed in a grayed-out state regardless of if a displayed rail terminates at the vertex or not.

Likewise, the user can direct that rails having an assigned zoom level which is larger than the currently-specified zoom level to be displayed in a grayed-out state. As such, these higher zoom level vertices and/or rails would be displayed in a grayed-out state as long as they intersect the currently specified viewport. It is noted that the aforementioned grayed-out graph entities could be visually distinguished in a different way if desired.

In yet another implementation, a user can select (via conventional methods) a grayed-out vertex or rail, or simply select a blank region that contains a vertex or rail that is not displayed owing to it having too high of a zoom level, in the currently displayed view of the graph. This selection would result in the zoom level being changed in the manner described previously to the zoom level value assigned to the selected vertex or rail.

2.0 Exemplary Operating Environments

Figure 11:
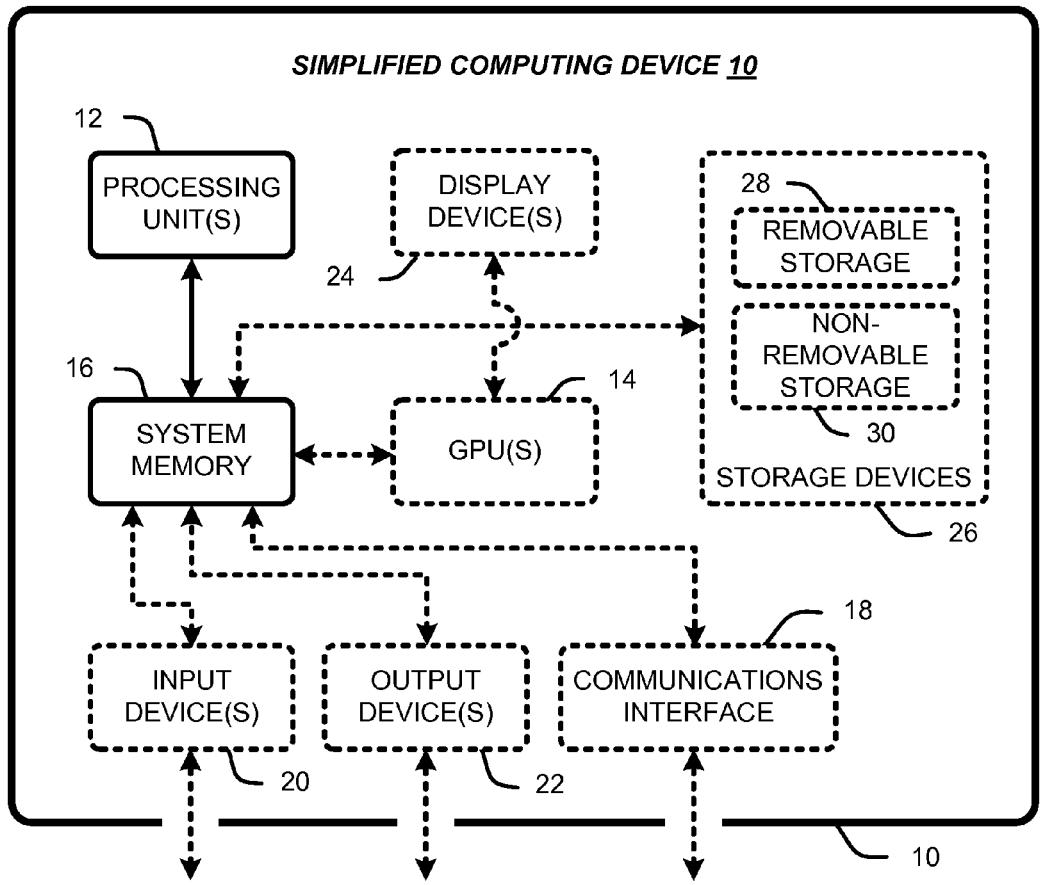
FIG. 11 is a diagram depicting a general purpose computing device constituting an exemplary system for implementing portions of the large graph visualization embodiments described herein.

The large graph visualization embodiments described herein are operational within numerous types of general purpose or special purpose computing system environments or configurations. FIG. 11 illustrates a simplified example of a general-purpose computer system on which various embodiments and elements of the large graph visualization, as described herein, may be implemented. It is noted that any boxes that are represented by broken or dashed lines in the simplified computing device 10 shown in FIG. 11 represent alternate embodiments of the simplified computing device. As described below, any or all of these alternate embodiments may be used in combination with other alternate embodiments that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to implement the large graph visualization embodiments described herein, the device should have a sufficient computational capability and system memory to enable basic computational operations. In particular, the computational capability of the simplified computing device 10 shown in FIG. 11 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other microcontroller) or can be conventional central processing units (CPUs) having one or more processing cores.

In addition, the simplified computing device 10 shown in FIG. 11 may also include other components such as a communications interface 18. The simplified computing device 10 may also include one or more conventional computer input devices 20 (e.g., pointing devices, keyboards, audio (e.g., voice) input devices, video input devices, haptic input devices, gesture recognition devices, devices for receiving wired or wireless data transmissions, and the like). The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 11 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EEPROM), flash memory or other memory technology, magnetic cassettes, magnetic tapes, magnetic disk storage, or other magnetic storage devices.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various large graph visualization embodiments described herein, or portions thereof, may be stored, received, transmitted, or read from any desired combination of computer-readable or machine-readable media or storage devices and communication media in the form of computer-executable instructions or other data structures.

Finally, the large graph visualization embodiments described herein may be further described in the general context of computer-executable instructions, such as program modules, being executed by a computing device. Generally, program modules include routines, programs, objects, components, data structures, and the like, that perform particular tasks or implement particular abstract data types. The data extraction technique embodiments may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for assigning zoom level values to vertices and rails of a graph, comprising:
  using a computer to perform the following process actions:
  computing and assigning zoom level values to vertices of the graph, wherein at each zoom level, vertices deemed to be the most important are assigned, in hierarchical order, a zoom level value associated with the zoom level, until at least one region of the graph associated with the zoom level has a prescribed maximum number of vertices assigned the zoom level value associated with the zoom level; and
  computing and assigning zoom level values to rails of the graph, said rails each being a curve segment in the graph that represents an edge or a set of edges passing through it;
  said zoom levels assigned to the vertices and rails of the graph facilitate a quicker rendering and display of the graph, or a part thereof, and a lower density of displayed vertices and rails, based on a currently-specified zoom level.

2. The process of claim 1, wherein the process action of computing and assigning zoom level values to vertices of the graph, comprises the actions of:
  a) receiving a set of vertices of the graph;
  b) receiving a layout of the graph comprising locations of each vertex in the received set of vertices;
  c) receiving vertex importance data comprising a hierarchical list of the received set of vertices ordered from the vertex deemed to be the most important to the vertex deemed to be the least important;
  d) selecting the smallest previously unselected zoom level value from a hierarchically-ordered set of zoom levels which ranges from smaller zoom level values to larger zoom level values;
  e) identifying a prescribed-sized bounding region associated with the currently-selected zoom level value;
  f) dividing the graph as laid-out based on the received graph layout into one or more tiles, each of which has a size corresponding to the currently-identified bounding region;
  g) determining whether there are one or more vertices from the received set of vertices that have not yet been assigned a zoom level value, and whenever there are, selecting a vertex from the set of vertices that has not yet been assigned a zoom level value in an order dictated by the vertex importance data starting with the vertex not yet having an assigned zoom level value that is deemed to be the most important, yet-unselected vertex in the vertex importance data, and whenever there are no more vertices from the received set of vertices that have not yet been assigned a zoom level value, ending the process action of computing and assigning zoom level values to vertices of the graph;

h) identifying the location of a center of bounding region containing the currently-selected vertex using said received graph layout;

i) identifying the tile that the currently-identified vertex center location resides within;

j) determining whether the number of vertices whose vertex center locations reside within the currently-identified tile and who have been assigned the currently-selected zoom level value exceed a prescribed maximum vertex quota;

k) whenever the number of vertices whose vertex center locations reside within the currently-selected tile and who have been assigned the currently-selected zoom level value does not exceed the prescribed maximum vertex quota, assigning the currently-selected zoom level value to the currently-selected vertex, and repeating actions g) through l); and l) whenever the number of vertices whose vertex center locations reside within the currently-selected tile and who have been assigned the currently-selected zoom level value exceeds the prescribed maximum vertex quota, repeating actions d) through l).

3. The process of claim 2, wherein the process action of computing and assigning zoom level values to rails of the graph, comprises the actions of:

a) receiving a set of edges of the graph;

b) selecting the smallest zoom level value from the hierarchically-ordered set of zoom levels which has not been selected in connection computing and assigning zoom level values to rails of the graph;

c) selecting vertices that are assigned the currently-selected zoom level value or a lower zoom level value;

d) identifying all edges using said graph layout that directly link a one of the currently-selected vertices to another one of the currently-selected vertices;

e) identifying up to a prescribed number of the highest ranking vertices that are also part of currently-selected vertices based on said vertex importance data, and designate the identified vertices as the top ranking vertices;

f) identifying edges of each sequence of edges using said graph layout which form the shortest, non-direct distance from a one of the currently-selected vertices to a one of the currently identified top ranking vertices;

g) routing the currently-identified edges;

h) selecting a previously unselected one of the currently-identified edges;

i) identifying the route of the selected edge;

j) identifying each curve segment in the identified edge route;

k) selecting a previously unselected one of the curve segments;

l) determining whether the route of the currently-selected curve segment corresponds to an established rail;

m) whenever it is determined the route of the currently-selected curve segment does not correspond to an established rail,
establishing the route of the currently-selected curve segment as a rail of the graph,
assigning the currently selected zoom level value to the newly established rail, and
determining whether there are any edges that are not yet part of one or more of the established rails, and whenever it is determined that there are edges that are not yet part of one or more of the established rails, repeating actions b) through n); and n) whenever it is determined the route of the currently-selected curve segment does correspond to an established rail, repeating actions h) through n).

4. A computer-implemented process for rendering and displaying vertices and edges of a graph, comprising:
using a computing device and a display device to perform the following process actions:
receiving a set of vertices of the graph, each of which comprises an assigned zoom level value, wherein zoom level values were assigned at each zoom level to vertices deemed to be the most important, in hierarchical order, until at least one region of the graph associated with the zoom level had a prescribed maximum number of vertices assigned the zoom level value associated with the zoom level;
receiving a set of rails of the graph, said rails each representing either a graph edge or a combination of portions of different graph edges, and each rail comprising an assigned zoom level value;
receiving a currently-specified viewport which specifies a portion of the graph that is to be rendered;
receiving a currently-specified zoom level; and
rendering and displaying those graph vertices and rails intersecting the currently-specified viewport whenever the assigned zoom level of the intersecting vertex or rail is less than or equal to the currently-specified zoom level such that said zoom levels assigned to the vertices and rails of the graph facilitate a quicker rendering and display of the graph, or a part thereof, and a lower density of displayed vertices and rails, based on a currently-specified zoom level.

5. The process of claim 4, wherein the process action of rendering those graph vertices and rails intersecting the currently-specified viewport whenever the assigned zoom level of the intersecting vertex or rail is less than or equal to the currently-specified zoom level, comprises the actions of:
computing a scale factor representing the ratio of a size of the currently specified viewport to a size of the smallest bounding region that contains the entire graph;
identifying each rail that intersects the currently-specified viewport and which has an assigned zoom level value that is less than or equal to the product of a prescribed size parameter and the computed scale factor;
identifying each vertex having a bounding region containing the vertex that intersects the currently-specified viewport, having an assigned zoom level value that is less than or equal to the product of the prescribed size parameter and the computed scale factor, and which is adjacent to at least one of the identified rails;
rendering the identified rails; and
rendering the identified vertices.

6. The process of claim 5, wherein the process action of rendering the identified rails, comprises the actions of:
rendering rails with a setting of no transparency whenever the rail has an assigned zoom level value that is less than or equal to the scale factor;
rendering rails with a setting of full transparency whenever the rail has an assigned zoom level value that is equal to the product of the size parameter and the scale factor; and
rendering each rail having an assigned zoom level value between the scale factor and the product of the size parameter and the scale factor to a transparency setting between no transparency and full transparency.

7. The process of claim 6, wherein the process action of rendering each rail having an assigned zoom level value between the scale factor and the product of the size parameter and the scale factor to a transparency setting between no transparency and full transparency, comprises setting the transparency setting linearly between no transparency and full transparency based on the where the assigned zoom level value falls between the scale factor and the product of the size parameter and the scale factor.

8. The process of claim 5, wherein the process action of rendering the identified vertices, comprises the actions of:
rendering a bounding region containing a vertex for each vertex having an assigned zoom level value that is less than or equal to the scale factor; and
rendering a bounding region containing a vertex for each vertex having an assigned zoom level value that is greater than or equal to the product of the size parameter and the scale factor so as to exhibit a size that varies depending a scaling parameter that ranges between 0 and 1 based on the currently-specified zoom level value wherein the scaling parameter increases as the currently-specified zoom level value decreases.

9. The process of claim 8, wherein the scaling parameter increases linearly as the currently-specified zoom level value decreases.

10. The process of claim 4, wherein the process action of rendering those graph vertices and rails intersecting the currently-specified viewport whenever the assigned zoom level of the intersecting vertex or rail is less than or equal to the currently-specified zoom level, comprises the actions of:
deeming a vertex to be intersecting the currently-specified viewport whenever a central point of a bounding region containing the vertex falls within the viewport; and
deeming a rail to be intersecting the currently-specified viewport whenever any part of the rail falls within the viewport.

11. The process of claim 10, further comprising a process action of rendering each vertex not having an assigned zoom level which is less than or equal to the currently-specified zoom level whenever a central point of a bounding region containing the vertex falls within the viewport and the vertex is a terminus of a rail having an assigned zoom level that is less than or equal to the currently-specified zoom level which intersects the currently-specified viewport.

12. The process of claim 11, further comprising rendering each vertex not having an assigned zoom level which is less than or equal to the currently-specified zoom level whenever a central point of a bounding region containing the vertex falls within the viewport and the vertex is a terminus of a rail having an assigned zoom level that is less than or equal to the currently-specified zoom level which intersects the currently-specified viewport, so as to distinguish the vertex from other rendered vertices that have an assigned zoom level which is less than or equal to the currently-specified zoom level.

13. The process of claim 12, wherein the process action of rendering each vertex not having an assigned zoom level which is less than or equal to the currently-specified zoom level whenever a central point of a bounding region containing the vertex falls within the viewport and the vertex is a terminus of a rail having an assigned zoom level that is less than or equal to the currently-specified zoom level which intersects the currently-specified viewport, so as to distinguish the vertex from other rendered vertices that have an assigned zoom level which is less than or equal to the currently-specified zoom level, comprises an action of rendering the vertex so as to exhibit a transparency setting that is greater than no transparency.

14. A system for browsing a graph comprising of vertices and edges, comprising:
a computing device comprising a display device and an user input device; and
a computer program having program modules executable by the computing device, the computing device being directed by the program modules of the computer program to,
provide a currently-specified viewport which is specified by a user via said user input device and which specifies a portion of the graph that is to be viewed, or a currently-specified zoom level, or both,
receive rendering data representing those graph vertices and rails intersecting the currently-specified viewport whenever the assigned zoom level of the intersecting vertex or rail is less than or equal to the currently-specified zoom level, wherein said rails each represent either a graph edge or a combination of portions of different graph edges, and wherein zoom level values were assigned at each zoom level to vertices deemed to be the most important, in hierarchical order, until at least one region of the graph associated with the zoom level had a prescribed maximum number of vertices assigned the zoom level value associated with the zoom level, and
display the portion of the graph specified by the currently specified viewport on the display device using the received rendering data, such that said zoom levels assigned to the vertices and rails of the graph facilitate a quicker rendering and display of the graph, or a part thereof, and a lower density of displayed vertices and rails, based on a currently-specified zoom level.

15. The system of claim 14, further comprising program modules which are executed prior to executing the program module for displaying the portion of the graph specified by the currently specified viewport on the display device using the received rendering data, said program modules comprising:
providing an instruction input by the user via said user input device which directs that vertices intersecting the currently-specified viewport that do not have an assigned zoom level which is less than or equal to the currently-specified zoom level to be rendered so as to exhibit a transparency setting that is greater than no transparency when displayed; and
receiving rendering data representing those vertices intersecting the currently-specified viewport that do not have an assigned zoom level which is less than or equal to the currently-specified zoom level.

16. The system of claim 14, further comprising program modules which are executed prior to executing the program module for displaying the portion of the graph specified by the currently specified viewport on the display device using the received rendering data, said program modules comprising:
providing an instruction input by the user via said user input device which directs that rails intersecting the currently-specified viewport that do not have an assigned zoom level which is less than or equal to the currently-specified zoom level to be rendered so as to exhibit a transparency setting that is greater than no transparency when displayed; and
receiving rendering data representing those rails intersecting the currently-specified viewport that do not have an assigned zoom level which is less than or equal to the currently-specified zoom level.

17. The system of claim 14, further comprising program modules which are executed prior to executing the program module for displaying the portion of the graph specified by the currently specified viewport on the display device using the received rendering data, said program modules comprising:

provide an instruction input by the user via said user input device which directs that rails intersecting the currently-specified viewport which are located adjacent a vertex also intersecting the currently-specified viewport be rendered regardless of the zoom level value assigned to the rails; and receiving rendering data representing those rails intersecting the currently-specified viewport which are located adjacent a vertex also intersecting the currently-specified viewport.

18. The system of claim 14, wherein said zoom level values assigned to the vertices and rails are chosen from a set of zoom level values defined by $2^{n-1}$ wherein n={1, 2, 3, . . . }, and wherein a zoom level value of "1" is the smallest zoom level value in the set.

19. The system of claim 18, wherein the set of zoom level values that can be assigned to the vertices and rails further comprises a global zoom level value which when assigned to a vertex or rail causes that vertex or rail to be rendered and displayed regardless of the currently-specified zoom level if the vertex or rail intersects the currently-specified viewport, said system further comprising program modules which are executed prior to executing the program module for displaying the portion of the graph specified by the currently specified viewport on the display device using the received rendering data, said program modules comprising:

providing an instruction input by the user via said user input device which directs that one or more vertices or rails, or both, be assigned the global zoom level value; and receiving rendering data representing those vertices or rails, or both, that have been assigned the global zoom level value and which intersect the currently-specified viewport.

20. The system of claim 14, wherein a vertex or rail, or both, can be rendered so as to exhibit a transparency setting that is greater than no transparency when displayed, further comprising program modules comprising:

providing an instruction input by the user via said user input device by the user selecting a vertex or rail exhibiting a transparency setting that is greater than no transparency in a currently displayed portion of the graph or selecting a blank area in a currently displayed portion of the graph associated with a vertex or rail that is not currently displayed owing to it having an assigned zoom level value that is not less than or equal to the currently-specified zoom level, to change the zoom level value assigned to the selected vertex or rail to the currently-specified zoom level;

receiving rendering data representing those graph vertices and rails intersecting the currently-specified viewport whenever the assigned zoom level of the intersecting vertex or rail is less than or equal to the currently-specified zoom level, and displaying the portion of the graph specified by the currently specified viewport on the display device using the received rendering data.

* * * * *